United States Patent

[11] 3,621,441

[72] Inventors Joseph R. Hudnall
Lancaster;
Paul C. Wergin, Reynoldsburg, both of Ohio
[21] Appl. No. 842,562
[22] Filed July 17, 1969
[45] Patented Nov. 16, 1971
[73] Assignee Western Electric Company Incorporated
New York, N.Y.

[54] FILM RESISTOR ADJUSTABLE BY ISOLATING PORTIONS OF THE FILM
2 Claims, 10 Drawing Figs.

[52] U.S. Cl. 338/195, 338/309
[51] Int. Cl. H01c 9/00
[50] Field of Search 338/195, 306, 308, 9; 29/620

[56] References Cited
UNITED STATES PATENTS

| | | | |
|---|---|---|---|
| 2,758,256 | 8/1956 | Eisler | 317/101 B |
| 2,693,023 | 11/1954 | Kerridge | 338/195 X |
| 3,473,146 | 10/1969 | Mulligan | 338/308 X |

*Primary Examiner*—Lewis H. Myers
*Assistant Examiner*—Gerald P. Tolin
*Attorneys*—H. J. Winegar, R. P. Miller and Don P. Bush

ABSTRACT: A film resistor includes a pair of conductive films which are spaced from each other and are deposited adjacent to opposite edges of one surface of a substrate. A plurality of spaced, parallel fingers extend transversely from each of the conductive films and partially into the space between the conductive films on the substrate. A resistive film is deposited onto the substrate in the space between the conductive films and overlaps the free ends of the fingers. The resistance value of the film resistor can be adjusted by removing selectively some or all of the fingers so that adjacent portions of the resistive film are substantially isolated electrically when the resistor is used in an environmental circuit even though the entire resistive film remains attached physically to the substrate and unmarred.

INVENTORS
J. R. HUDNALL
P. C. WERGIN
BY [signature]
ATTORNEY

FILM RESISTOR ADJUSTABLE BY ISOLATING PORTIONS OF THE FILM

BACKGROUND OF THE INVENTION

1. Field of the Invention

This invention relates to a film resistor and methods of adjusting resistance values thereof and particularly relates to a film resistor having selectively removable conductor portions which facilitate the substantial electrical isolation of portions of a resistive film to adjust resistance values thereof.

2. Description of the Prior Art

Two types of film components which are presently manufactured are referred to as thin-film and thick-film components. The thin-film type of component is manufactured by numerous processes which include evaporation, sputtering or chemical deposition of a thin-film material onto a supporting substrate. The thick-film type of component is usually manufactured by a printing and firing technique. The latter technique utilizes various prepared compositions which are deposited selectively onto a substrate in a printing process and the substrate is then heated in a furnace to cause a chemical reaction within the composition which results in the adherence of a film of the composition to the substrate and the bonding of metallic particles within the composition to form conductive or resistive elements of the thick-film component.

In the manufacture of thick-film resistors, spaced conductive films are deposited onto a substrate and a resistive film material is deposited onto the substrate in the space between the conductive films with edge portions of the resistive film overlapping adjacent edge portions of the conductive film to facilitate an electrical connection therebetween. In the manufacture of thin-film resistors, a resistive film is deposited onto a substrate and the conductive films are deposited onto spaced areas of the substrate in overlapping engagement with opposite edge portions of the resistive film. In order to establish required resistance values of the film resistors, various techniques are employed and frequently involve an abrading operation wherein selected portions of the resistive film material are abraded away.

A typical abrading process includes the use of an airstream carrying an abrasive media which is directed toward and against selected portions of the resistive film material. Generally, the resistors trimmed by the abrasive technique are not stable and result in fluctuating resistance values when the trimmed resistors are utilized in an environmental circuit. The abrasive techniques causes the formation of irregular surfaces on adjacent portions of the remaining resistive material. The abrading technique also causes variation in the thickness of the resistive material adjacent to the trimmed areas of the material.

In an attempt to prevent the undesirable effects of the abrading technique, a glass overcoat may be printed on top of the resistive film and the abrasive trimming can be accomplished through the overcoat with reduced disturbance of the resistive film material adjacent to the area of the material being trimmed. However, in order to develop maximum stability in the resistive film which has been trimmed by the abrading technique, another glass overcoat should be applied to seal the resistive film material after the adjusting procedure.

Although the overcoat technique improves the stability characteristics of the film resistor, the resistor is not sufficiently stable for certain high-quality circuit operations such as those required in the communications industry. Further, an additional expense is incurred in the additional overcoat operation.

Radiant energy can also be used to effect the trimming of film resistors by selectively controlling the placement of the energy onto portions of the resistive film. However, this technique also requires the disturbing of the surface of the resistive film which results in similar deleterious effect.

Another technique for manufacturing film resistors includes the steps of depositing a first web of conductive film along one edge of a surface of a supporting substrate with spaced, parallel finger portions extending transversely from the web substantially across the surface of the substrate. A second web of conductive film is deposited along the opposite edge of the surface of the substrate and is provided with spaced, parallel finger portions which extend transversely from the web toward the other web and which are spaced from and interspersed with the finger portions of the other web. A resistive film material is deposited transversely onto the intermediate portions of the finger portions of each of the webs and onto portions of the surface of the substrate between adjacent fingers so that the individual resistors are formed between each of the adjacent fingers extending from the webs. Portions of the conductive fingers extending from the webs. Portions of the conductive webs can then be removed selectively to remove a selected number of the individual resistors from the total resistor circuit thereby adjusting the total resistance value.

While this structure permits an adjustment of resistance values without trimming of the resistive film material, a considerable portion of the resistive film material is required to overlap the finger portion of the conductive material. Thus, a substantial portion of the resistive film is utilized in the connecting of the resistive film to the conductive films. In addition, this design utilizes a principle of connecting a plurality of individual resistors in a series-parallel combination with facilities to remove electrically selected individual resistors and does not permit the fine adjustment of the resistive value of a single resistive element.

Thus, it becomes apparent that a new film resistor and technique for adjusting the resistance value thereof is needed wherein injury to the resistive film material is substantially reduced or eliminated and stability of resistance value is achieved.

SUMMARY OF THE INVENTION

It is, therefore, an object of this invention to provide a new and improved film resistor and methods of adjusting resistance values thereof.

Another object of the invention is to provide a new and improved film resistor which is adjustable to a desired resistance value without abrading or disturbing a resistive film.

Still another object of the invention is to provide a new and improved film resistor which utilizes a major portion of a single resistive film to establish a resistance value and spaced, parallel conductive fingers in engagement with opposite sides of the resistive film which may be selectively removed to substantially isolate electrically portions of the resistive film to adjust the resistance value thereof.

A film resistor illustrating certain principles of the invention may include a resistive film deposited onto a substrate and having opposite edges thereof overlapping and in engagement with the free end of a removable conductive means which extends from at least one of a pair of spaced conductive films which are connected electrically to edge portions of the resistive film.

A method of adjusting the resistance value of film resistors which embodies certain principles of the invention may include selective removal of portions of contact material attached to adjacent areas of a resistive film to substantially isolate electrically the adjacent areas of the resistive film from remaining areas of the resistive film.

BRIEF DESCRIPTION OF THE DRAWINGS

Other objects and advantages of the present invention will be apparent from the following detailed description when considered in conjunction with the accompanying drawings in which.

DETAILED DESCRIPTION

Figures 1, 2, 3, 4:
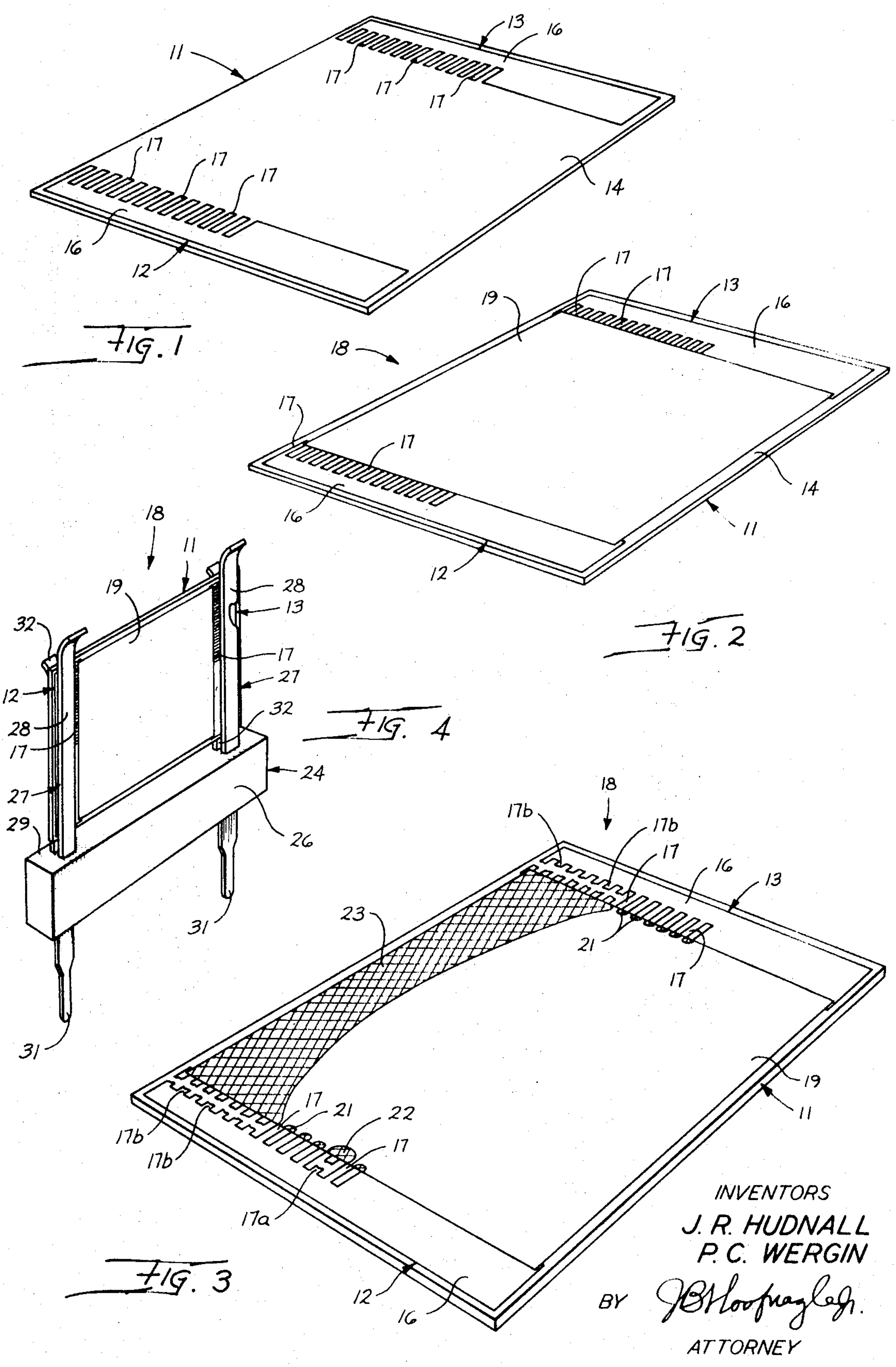
FIG. 1 is a perspective view showing two conductive films supported on opposite sides of one surface of a substrate with the film including conductive fingers extending therefrom.
FIG. 2 is a perspective view showing a film resistor in accordance with certain principles of the invention wherein a resistive film is positioned on an intermediate portion of a substrate with opposite side portions of the film overlaying the free ends of conductive fingers.
FIG. 3 is a perspective view showing selected conductive fingers removed to substantially isolate electrically portions of the resistive film of the film resistor of FIG. 2 in accordance with certain principles of the invention.
FIG. 4 is a perspective view of the film resistor of FIG. 2 mounted in a support.

Referring now to FIG. 1, there is illustrated a substrate, designated generally by the reference numeral 11, which may be composed of any suitable insulating material. A pair of conductive films, designated generally by the reference numerals 12 and 13, are deposited onto spaced areas of a surface 14 of the substrate 11. Each of the conductive films 12 and 13 include a web 16 which extends along the adjacent edge of the surface 14 and a plurality of spaced, parallel fingers 17—17 formed integrally therewith and extending transversely inwardly from the associated web. It is noted that the conductive films 12 and 13 may be deposited onto the substrate 11 in any conventional manner depending upon whether the film is of thick or thin-film type. The material utilized in the conductive films 12 and 13 should be highly conductive so that the films function as conductors.

Referring now to FIG. 2, there is illustrated a film resistor, designated generally by the reference numeral 18, which includes a resistive film 19 deposited onto an intermediate portion of the surface 14 of the substrate 11. Upper opposite edge portions of the resistive film 19 overlapping free end portions of the fingers 17—17 of the conductive films 12 and 13 and lower opposite edge portions of the resistive film overlap adjacent inner edge portions of the webs 16—16.

While the resistor 18, which is illustrated in FIG. 2, includes fingers 17—17 extending from both webs 16—16, the resistor could function in accordance with the principles of the invention with the fingers extending from only one of the webs. In this unillustrated embodiment of the resistor 18, one upper edge portion of the resistive film 19 overlaps the free ends of the fingers 17—17, the lower edge portion of the same side of the resistive film overlaps the lower, adjacent edge portion of the web 16 which is associated with the fingers and the opposite edge portion of the resistive film overlaps an inner edge portion of the fingerless web 16. In addition, the fingers 17—17 of the resistor 18 could extend from all inner edge portions of the associated webs 16—16 without departing from the scope of the invention wherein opposite edge portions of the resistive film 19 would overlap only the free end portions of the fingers.

Referring now to FIG. 3, there is illustrated the film resistor 18 having selected fingers 17*a* and 17*b*—17*b* remove to establish a desired resistance value for the resistor. In order to display the effectiveness of removing selected fingers 17—17, gridlines have been drawn on areas 21—21, 22 and 23 of the resistive film 19 to illustrate those areas of the film which are substantially isolated electrically in the establishment of the desired resistance value of the resistor 18. The areas 21, 22—22 and 23 of the resistive film 19 remain physically unmarred and intact with the remaining areas of the resistive films but have substantially less current flow therethrough when the resistor 18 is used in an external circuit (not shown). Therefore, while the areas 21, 22—22 and 23 do have an extremely small amount of current flow therethrough, they are substantially electrically isolated from the remaining areas which have a substantial amount of current flow therethrough.

Since a space is formed between each pair of adjacent fingers 17—17, the substantially electrically isolated 17*b*, 21—21 appear in the resistive film 19 adjacent to each of the spaces. If a selected finger, for example, the finger 17*a*, is cut so that the conductive path through the finger and between the web 16 and the resistive film 19 is discontinuous, the substantially electrically isolated area 22 is developed in the resistive film. If a sufficient number of fingers, for example, the fingers 17*b*—*b*, are removed, the much larger area 23 of the resistive film 19 is substantially isolated electrically from the remaining areas of the film. Thus, the removal of individual fingers 17—17, singly or in a group, develops the substantially electrically isolated areas 22—22 and 23 which facilitates the increasing of the resistance value of the resistor 18. In this manner, the resistance value for sizable resistors 18—18 can be adjusted accurately with extremely small changes and without physically marring the resistive film 19 and creating other serious deleterious effects.

Referring now to FIG. 4, there is illustrated a holder, designated generally by the reference numeral 24, for supporting the resistor 18 for a connection with an external circuit (not shown) The holder 24 includes a support block 26, composed of an insulating material, which supports a pair of spaced terminal elements, designated generally by the reference numeral 27. Each of the terminal elements 27—27 includes a resistor contact portion 28 which extends from one side 29 of the block 26 and is positioned for engagement with an associated one of the webs 16—16 of the conductive films 12 and 13. A terminating portion 31 of each of the terminal elements 27—27 extends from the opposite side of the block 26 and is formed integrally with the contact portion 28.

A pair of clamp members 32—32 extend upwardly from the side 29 of the block 26 adjacent to associated contact portions 28—28 of the terminal elements 27—27. The film resistor 18 is assembled with the holder 24 so that the contact portions 28—28 of the terminal elements 27—27 cooperate with the associated clamping members 32—32 to clamp the resistor with the holder. Since the contact portions 28—28 of the terminal elements 27—27 are in engagement with the associated conductive films 12 and 13 of the resistor 18, the external circuit may be connected to the terminating portions 31—31 of the terminal elements to facilitate the electrical connection of the resistor within the circuit.

Figures 5, 6, 7:
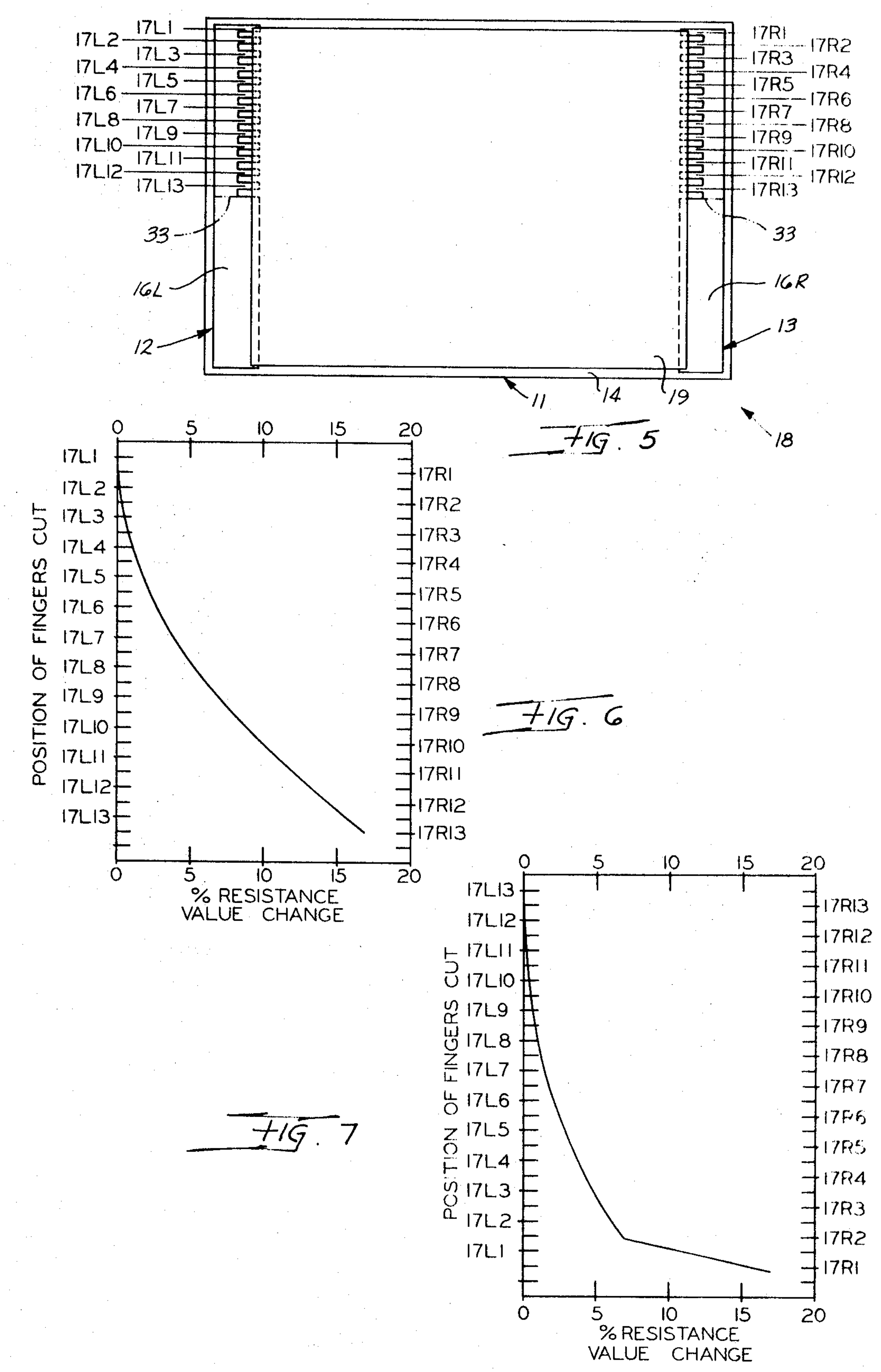
FIG. 5 is a view showing each finger of the film resistor of FIG. 2 numbered for selective removal.
FIGS. 6 through 10 are graphs representing the percent resistance change obtained by selective removal of the fingers of the film resistor illustrated in FIG. 5.

Referring now to FIG. 5, the resistor 18 is illustrated with each of the fingers 17—17 being numbered with an individually assigned number. For example, the finger 17L1 is the uppermost finger on the left side of the resistor 18 and the finger 17R13 is the lowermost finger on the right side of the resistor. The number 17 indicates that the numbered element is one of the fingers 17—17 of the resistor 18, the letter L or R indicates that the finger is on the left or the right side, respectively, of the resistor and the numbers 1 through 13 which follow the letters L and R indicate the position of the finger relative to the top of the resistor as it appears in FIG. 5. The resistance value of the resistor 18 can be adjusted by using various sequences of removing selected fingers 17—17 and also by disconnecting the lower portion of each of the webs 16—16 of the conductive films 12 and 13 from the upper portions of the webs which may be accomplished by removing intermediate portions of the webs along the dashed lines 33—33.

The results of some examples of adjusting the resistance value of the resistor 18 are illustrated graphically in FIGS. 6 through 10 where the percent of resistance charge is accomplished by selectively removing the fingers 17L1 through 17L13 and 17R1 through 17R13 in various prearranged sequences. It is to be understood that the graphically displayed percentage changes in resistance have been accomplished with a resistor, such as the film resistor 18, with elements of the resistor having predefined physical dimensions. The physical dimensions of the elements of the resistor 18 could be varied to obtain different percentage changes of resistance without departing from the scope of the invention.

Referring again to FIG. 5, one example of adjusting the resistance value of the resistor 18 utilizes a pattern of removing the fingers 17L1, 17R1, 17L2, 17R2 and continues this alternating pattern from side to side of the resistor until the last finger 17R13 is removed. As shown in the graph of FIG. 6, the removal of the fingers 17L1 through 17R13 in the alternating pattern, provides a percent resistance increase in fine increments from 0 to approximately 17 percent. It is noted that small increments of increase in the resistance value are accomplished as each of the fingers 17L1 through 17R13 is removed and that a desired percentage increase in resistance value up to approximately 17 percent can be obtained.

Referring again to FIG. 5, another example of adjusting the resistance value of the resistor 18 utilizes a pattern of removing the fingers 17L13, 17R13, 17L12, 17R12 and continues this alternating pattern from side to side of the resistor until the last finger 17R1 is removed. As illustrated in the graph of FIG. 7, this procedure of resistance change provides a fine adjustment of the percent resistance increase of the resistance value of the resistor 18 from 0 to approximately 7 percent and then provides a coarse adjustment in the percent resistance increase from approximately 7 to approximately 17 percent.

Figures 8, 9, 10:
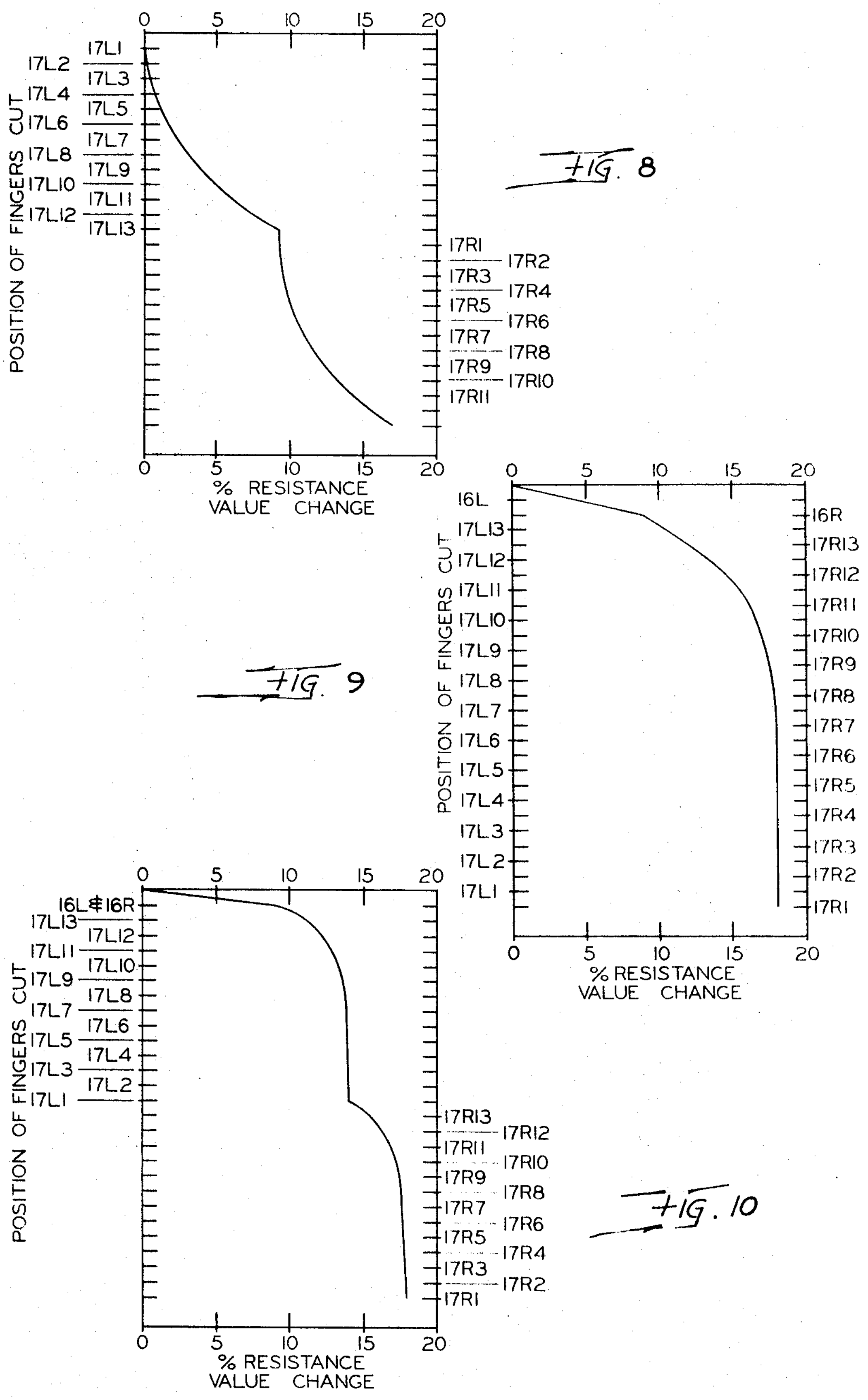

Referring again to FIG. 5, in another example of adjusting the value of the resistor 18, all of the fingers 17L1 through 17L13 on the left side of the resistor are removed successively and then all of the fingers 17R1 through 17R13 on the right side of the resistor are removed successively. As shown in the graph of FIG. 8, this pattern of removing of the fingers 17L1 through 17L13 successively permits a fine adjustment in the percent increase of the resistance value of the resistor 18 from approximately 0 to approximately 10 percent. As the fingers 17R1 through 17R13 are removed successively, the percent change in the resistance value increases in fine increments from approximately 10 to approximately 17 percent.

Referring again to FIG. 5 still another example of adjusting the resistance value of the resistor 18 is initiated when the web 16L is cut along the associated dashed line 33 to separate the lower portion of the web from the upper portion thereof whereby the resistance value of the resistor 18 increases in value by approximately 4 percent. Thereafter the web 16R is cut along the associated dashed line 33 to separate the lower portion of the web from the upper portion thereof whereby the resistance value of the resistor 18 increases approximately another 4 percent for a total increase of approximately 8 percent. Thereafter the fingers 17L1 through 17L13 and 17R1 through 17R13 are removed in the alternating pattern of removing the fingers 17L13,17R13,17L12 and 17R12 this alternating pattern of removing the fingers from side to side of the resistor 28 is continued until the last finger 17R1 is removed. As illustrated in the graph of FIG. 9, the removal of the fingers 17L1 through 17R13 in the above-mentioned alternating pattern provides a percent increase in resistance value from 8 to approximately 18 percent.

Referring again to FIG. 5, a further example of adjusting the resistance value of the resistor 18 is initiated when the webs 16L and 16R of the conductive films 12 and 13 are cut simultaneously along the dashed lines 33—33 which provides an 8 percent increase in the resistance value of the resistor 18. Thereafter all of the fingers 17L1 through 17L13 on the left side of the resistor 18 are removed successively starting with the removal of the finger 17L13 and ending with the removal of the finger 17L1. This produces an incremental percentage increase in the resistance value of the resistor 18 from 8 to approximately 14 percent. Thereafter all of the fingers 17LR1 through 17R13 on the right side of the resistor 18 are removed successively with the finger 17R13 being the first finger removed and the finger 17R1 being the last finger removed. The removal of the fingers 17R1 through 17R13 results in an incremental percentage increase in the resistance value of the resistor 18 from approximately 14 to approximately 18 percent.

While the patterns of resistance changes displayed in the graphs of FIGS. 6 through 10 illustrate various possibilities of adjusting incrementally the resistance value of the resistor 18, other patterns of resistance value changes can be accomplished be selecting different sequences of removing the fingers 17—17 and by changing physical dimensions of the elements of the resistor.

What is claimed is:

1. A resistor structure, which comprises:
a nonconductive substrate having a planar surface;
a rectilinear, planar film of resistive material on said planar surface having at least a pair of edges;
a pair of strips of conductive material on said substrate, said strips being spaced from said edges of said film;
two sets of fingerlike conductive elements extending from the strips along said planar surface of the substrate, each fingerlike element having a terminal section in engagement with the edge of said film adjacent to said strip from which the terminal section extends, each terminal section terminating adjacent to said adjacent edge of said film to establish a current path from the terminal sections of one set of said fingerlike elements, across the entire area of the film, and to the terminal sections of the other set of said fingerlike elements, said fingerlike elements being severable to reduce electrically the effective area of the current path from one set of elements, across said film to the other set of elements, across said film to the other set of elements to increase the resistance of said current path while retaining the entire area of the film physically intact.

2. A resistor structure, which comprises:
a nonconductive substrate having a planer surface;
a rectilinear, planar film of resistive material on said planar surface having a pair of parallel edges;
a pair of strips of highly conductive material on said substrate, said strips being spaced from and parallel to said parallel edges of said film;
two sets of fingerlike conductive elements composed of the highly conductive material and formed integrally with and extending toward each other from the strips along said planar surface of the substrate, each finger like element having a terminal section underlying the edge of said film adjacent to said strip from which the terminal section extends, each terminal section terminating adjacent to said adjacent edge of said film to establish a current path in the resistor structure which includes the pair of strips, each of the fingerlike elements and the entire width and length of the film, said fingerlike elements being severable to reduce the effective width of the current path from one set of elements, across said film to the other set of elements to increase the resistance of said current path.

* * * * *

L-566-PT
(6-69)

UNITED STATES PATENT OFFICE
CERTIFICATE OF CORRECTION

Patent No. 3,621,441 Dated November 16, 1971

Inventor(s) J. R. Hudnall - P. C. Wergin

It is certified that error appears in the above-identified patent and that said Letters Patent are hereby corrected as shown below:

Column 2, line 8, after "onto" delete "the". Column 2, line 11, after "that" delete "the". Column 2, lines 12-13 "Portions of the conductive fingers extending from the webs." should be deleted. Column 3, line 60, "remove" should read --removed--. Column 4, line 2, delete "17b" and substitute --areas--. Column 4, line 9, "17b-b" should read --17b-17b--. Column 4, line 23, a period (.) should follow "(not shown)". Column 4, line 62, after "along" delete "the". Column 4, line 66, "charge" should read --change--. Column 5, line 31, "approximate preceding "0" should be deleted. Column 5, line 33, after "change in" delete "the". Column 5, line 47, "and" should follow "17R12". Column 5, line 49, "28" should read --18--. Column 6, line 2, "17LR1" should read --17R1--. Column 6, line 14, "be" should read--by--. Column 6, lines 36-37, ",across said film to the other set of elements" should be deleted. Column 6, line 41, "planer" should read --planar--.

Signed and sealed this 4th day of July 1972.

(SEAL)
Attest:

EDWARD M.FLETCHER,JR.
Attesting Officer

ROBERT GOTTSCHALK
Commissioner of Patents